July 23, 1968     W. S. FORTUNE     3,393,856
COMBINATION SOLDER-DESOLDER IMPLEMENT
Filed Aug. 4, 1966
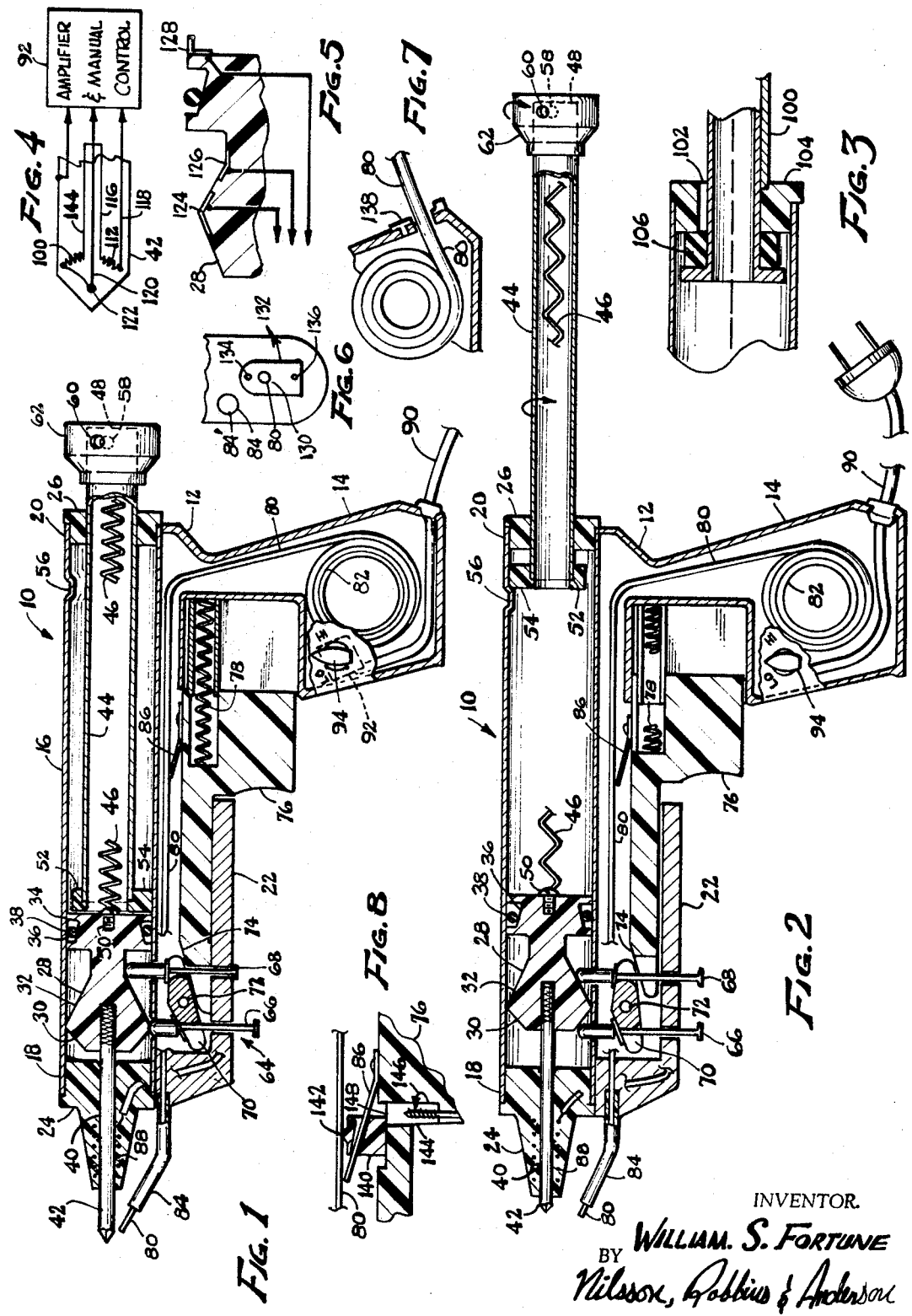
INVENTOR.
WILLIAM. S. FORTUNE
BY
Nilsson, Robbins & Anderson
ATTORNEYS

United States Patent Office 3,393,856
Patented July 23, 1968

3,393,856
COMBINATION SOLDER-DESOLDER
IMPLEMENT
William S. Fortune, 14250 Dearborn St.,
Panorama City, Calif. 91402
Filed Aug. 4, 1966, Ser. No. 570,307
2 Claims. (Cl. 228—53)

This invention relates generally to electrical and electronic equipment manfacture, repair, and rebuilding, and more particularly to the soldering and the removal of molten solder from electrical wiring connections. The present invention, in part, relates to and constitutes improvements relative the inventions shown and discussed in United States Patents Nos. 3,114,026 and 3,263,889.

Although the present invention finds particularly useful application in the field of soldering and desoldering and rewiring elements or components by technicians or engineers in an electronic research laboratory or at a hobbyist's workbench, and although, in the cause of brevity and clarity much of the following discussion of examples of the invention are directed theretoward, it is expressly to be understood that the advantages of the invention are equally well manifest in other fields where soldering and desoldering is to be accomplished.

As is well known to persons skilled in the electrical arts, it is often desired to solder, desolder, and resolder an electrical connection; and the removal of the molten solder from the connection, without dropping or spattering molten solder on to other portions of the equipment, is highly advantageous. Blowing the molten metal away is not an acceptable practice therefore; and the high surface tension associated with the solder precludes or causes to be impractical the removal of the solder by means other than vacuum device. The problem is typically aggravated by the requirement that the solder be removed in its molten state before a mechanical connection, such as a wrapped wire lead, under the solder may be taken apart.

Some portions of the problem have been successfully solved by the development in recent years of solder removing tools, examples of which are described in the above referenced patents. The apparatus disclosed in the earlier of these two patents, for example, includes a small, hand-held, thin-walled cylinder which houses a spring-loaded vacuum-producing piston. The piston is connected to an axial shaft which passes through a bushing assembly at the rearward end of the cylinder and is terminated by a cocking knob. The bushing end of the cylinder also includes a trigger means which cooperates with the shaft in a manner to hold the piston, against the spring force, near the opposite or tip end of the cylinder until the trigger is depressed. The tip end is substantially closed by a tip member having a solder removing hollow tube extending therethrough and which in operation is placed near this molten solder to be removed. When the trigger is depressed, the piston is forced by the spring quickly to the upper or rearward end of the cylinder and the resulting vacuum draws the molten solder into the cylinder through the hollow tube of the tip member. These devices have advanced the state of the art and have in large measure solved certain aspects of the problem outlined; however, they suffer, for some applications, disadvantages due to the flyback action of the piston-shaft-knob assembly during the vacuum stroke. The shaft which connects the spring-loaded piston to the cocking knob must be heavy and strong enough to cock the loading spring and the knob must be large enough and soft enough for convenient, repeated cocking by the operator. These factors cause the piston-shaft-knob assembly to have considerable mass compared to the lightweight cylinder housing. Consequently, when the trigger is depressed and the piston assembly flies back, the outer housing suffers a recoil action causing a deflection of the tip from the location of the molten solder. Another disadvantage of the flyback associated with the knob and shaft is that typically the operator places his head near the tool during the vacuum stroke and his eye may easily be injured if struck by the cocking knob.

It is also well known in these fields that in the prior art, when one solders, he uses one tool, namely a soldering iron, and when he desolders, he must simultaneously or very quickly sequentially, use two tools, namely a soldering iron and a solder-removing means. Therefore, at best, the user must, in rapid succession, pick up and operate two separate tools; or, more typically, use both hands for desoldering with one tool in each hand. Obviously the latter technique precludes using one hand for achieving other useful or necessary functions such as holding the circuit board or unwrapping wire leads or the like.

Accordingly, it is a general object of the present invention to provide novel combination solder and vacuum desoldering apparatus and to provide such which is not subject to these or other disadvantages of the prior art.

It is another object to provide such apparatus which also dispenses wire solder as needed and which is of a character to be readily on hand to the user at all times in a single, one hand, compact tool which may have a pistol grip configuration.

It is another object to provide such apparatus which has no exposed flyback portion.

It is another object to provide such apparatus which has very low inertia associated with the flyback portion thereby causing a negligible deflection of the tool during the vacuum stroke.

Very briefly these and other objects are achieved in one example of the invention which includes an overall pistol body configuration having as a barrel and muzzle assembly a tubular body having a spring-loaded piston therein which is cocked by pushing toward the muzzle, or tip, end with a cocking shaft pushed into the opposite, or breach, end of the tubular body. The piston member is held in its forward position by a trigger mechanism which is coupled mechanically to a trigger-like element below the tubular body portion.

The cocking shaft may then be pulled rearwardly and held there by a cam mechanism against tension force in a spring stretched between the rear tip end of the hollow cocking shaft and rear portion of the piston member. Thus, when the trigger is actuated, the piston member flies back to create a reduced pressure region between the piston member and the muzzle or tip end.

A lightweight, cylindrical soldering rod is carried by the piston member and extends forwardly therefrom through the hollow muzzle duct of the forward tip end. Carried by the tip end and contiguously surrounding the hollow bore thereof is a heating coil energized by an external alternating current source. Thusly the soldering rod may be used to melt the solder, then, when molten, the trigger may be actuated to cause the rearward flyback of the piston member causing, in turn, the drawing in, through the hollow muzzle tip, the molten solder.

A coil magazine of wire solder which is fed through a channel below the barrel of the tool to a dispensing port disposed contiguously to the muzzle tip is disposed within the pistol-like handle in this example. By means disclosed and discussed hereinbelow, operation of the trigger actuator, when the piston member is not cocked, causes a digital or ratchetlike feedout of the wire solder from the magazine to the dispensing port.

Also disposed within the handle is an SCR (Silicon-

Controlled Rectifier) current control circuit for adjusting the heat output of the soldering rod heater coil.

Additional features of the present invention which are believed to be novel and patentable are set forth in the claims which forms a part of this specification and which define the scope of the invention. For a better understanding of the invention, however, reference is made to the following description of the accompanying drawing which is presented expressly by way of example only and in which:

FIGURE 1 is a longitudinal sectional view of an example of a combination solder-desolder implement constructed in accordance with the principles of the present invention and which is shown in a soldering and solder-dispensing disposition;

FIGURE 2 is a similar view of the same structure shown in a cocked disposition ready for a desoldering, vacuum stroke operation;

FIGURE 3 is a sectional view of a portion of an alternative embodiment of the invention;

FIGURE 4 is a schematic diagram of an alternative form of the soldering tip heating control circuit;

FIGURE 5 is a sectional view of a portion of the structural aspects of the embodiment of FIGURE 4;

FIGURE 6 is a frontal elevational view of a portion of an alternative form of the invention;

FIGURE 7 is a side elevational view of a portion of an alternative example of the invention; and FIGURE 8 is a sectional view of an alternative example of the automatic solder feeding mechanism constructed in accordance with the present invention.

Referring to the particular figures, it is stressed that the detailed showing is by way of example and for purposes of illustrative discussion only and is presented in the cause of providing what is believed to be the most useful and readily understood description of the principles and structural concepts of the invention. In this regard no attempt is made to show structural details of the apparatus in more detail than is necessary for a fundamental understanding of the invention. The description taken with the drawing will make it apparent to those skilled in the electrical and mechanical arts how the several forms of the invention may be embodied in practice. Specifically, the detailed showing is not to be taken as a limitation upon the scope of the invention which is defined by the appended claims forming, along with the drawing, a part of this specification.

In FIGURE 1, the example of the solder-desoldering combination implement 10 includes a generally pistol configured body 12 having a hollow handle portion 14, a tubular barrel member 16 having forward muzzle and rearward, breach ends 18, 20, respectively, a barrel base elongate portion 22, a muzzle tip member 24, and a bushing member 26. Housed axially slidably within the tubular body member 16 is a piston member 28 having a forwardly inclined nose taper surface 30 and a rearwardly inclined taper surface 32. The rear cylindrical portion 34 of the piston member 28 carries a rearwardly inclined piston ring retaining channel 36 and an O-ring 38 therewithin. The rearwardly inclined, conical channel 36 provides a variable sealing engagement between the piston member 28 and tubular body member 16 depending upon the sense of axial motion associated with the piston member. For a rearward vacuum stroke, the seal is relatively airtight, while it is relatively loose for forward motion of the piston member.

The muzzle tip member 24 is provided with an axial bore 40 which is adapted to receive, as shown, therethrough a soldering rod element 42 which is mounted axially on the forward portion of the piston member 28 and protrudes axially forwardly thereof through the bore 40 when the piston member 28 is disposed in its forward disposition as shown.

A hollow cocking shaft 44 is disposed axially slidingly through the bushing member 26 in a push engageable relation with respect to the rear surface of the piston member 28. A tension spring 46 is secured at its opposite end to the interior rear tip closed end 48 of the cocking shaft 44 and the rear surface of the piston member 28 at a retaining screw 50. A cam element 52 having a radially raised portion 54 thereon is shown affixed to the forward tip end of the cocking shaft 44. This raised cam portion 54 is retainingly engageable with a detent 56 formed in the rear portion of the thin wall of the hollow tubular body member 16 depending upon the angular disposition of the shaft 44 with respect thereto.

Disposed contiguously to the closed end 48 of the cocking shaft 44 is shown a pneumatic relief port 58 which, in cooperation with a registrable port 60 in the cocking knob 62 carried rotatably by the end portion of the cocking shaft 44, provides a control for the shape of the pulse of the air drawn through the duct 40 upon flyback of the piston member 28.

A trigger mechanism 64 mounted within the base portion 22 comprises, in this example, a pair of reciprocally related piston engaging pin members 66, 68, which are guided, as shown, to move vertically parallel to each other and radially with respect to the axis of the tubular body member 16. The pin members 66, 68, are axially separated by a distance approximately equal to the axial length of the rearwardly inclined tapered surface 32 of the piston member 28. The pin members 66, 68 effectively ride on the inclined surfaces 30, 32 and are pivotally carried by a rocker arm member 70 mounted to the base portion 22 by a pivot joint 72. Thusly it may be seen that forward cocking action of the piston member 28 causes a radially outward disposition of the forward pin 66 and a corresponding radially inward disposition of the rear pin 68. In this position, it is clear that the piston member 28 is held in its forward disposition until or unless the rear pin 68 is permitted to move radially outwardly; and such action is precluded, when desired, by a forward inclined surface tip portion 74 of a trigger actuating member 76 which is fore and aft slidably housed within the base and handle portions 22, 14. The trigger actuator member 76 is urged forwardly by a compressed spring 78 which is captively housed within the handle portion 14 between the rear of the actuator member 76 and the body of the handle as shown. This forward urging of the trigger actuator causes engagement of the inclined surface 74 with the rocker arm member 70 whereby to preclude rearward flyback of the piston member 28 until the trigger actuator is depressed rearwardly as by the finger of the operator. This permits any tension in the spring 46, if cocked, to cause the piston member to tend to move rearwardly and to force the pin member 68 out of the path thereof.

It may be noted that trigger actuator reciprocation, particularly when the piston member is not cocked and now under pulling forces exerted by the tension spring 46, causes a ratchetlike feeding of the wire solder 80 from a magazine or reservoir coil 82 housed within the hollow handle 14 to a tip dispenser tube 84 which ejects the wire solder onto or contiguously near to the tip of the soldering rod element 42. The ratchet feed action is accomplished by an edge sharpened, upwardly spring biased leaf ratchet 86 which is driven in the forward direction by the spring 78 after a rearward displacement of the trigger actuator member 76.

A heater coil 88 is disposed within the muzzle tip member 24 in heat energy interchange relation with the soldering rod element 42 shown disposed in the duct 40 thereof. The heating coil is energized by, in this example, external alternating current electrical power supply through a power cord 90. The effective magnitude of current flow to the heating coil, and thereby its heating effect, may be controlled by an adjustable SCR circuit 92 housed within the hollow handle portion 14 and having an adjustable dial 94 communicating externally thereof as shown.

In operation the plunger cocking shaft 44 may be inserted substantially full length into the tubular body member 16 through the bushing member 26 to cause a locking of the piston member 28 at the forward end by the trigger mechanism pin member 66, 68 as discussed above. The cocking shaft may then be withdrawn until the cam element 52 is rearward of the detent 56, whereupon the shaft 44 may be rotated whereby the raised portion 54 thereof is disposed retainingly behind the detent 56. The spring 46 is then in full, design tension; and, if the valve ports 58, 60 are properly adjusted by rotation of the knob 62 with respect to the shaft 44, the implement is ready for melting the desired solder with the soldering rod element 42, gradually depressing the trigger actuator 76 to withdraw the element 42 within the duct 40 as desired, and then, when the solder is in its molten state, depress the trigger all the way and permit the flyback of the piston member 28.

The implement 10 in the state immediately prior to the flyback vacuum stroke is illustrated in FIGURE 2. In this figure the cam element 52 is shown with its raised portion 54 engaged behind the detent 56 and with the piston member held forwardly by engagement with the pin members 66, 68. In this condition the tension spring 46 is substantially fully stretched to its desired limit. Note in FIGURE 2 that the trigger actuator member 76 is partially rearwardly displaced and that the rocker arm 70 has accordingly rotated clockwise somewhat from its position indicated in FIGURE 1, thusly to permit the withdrawal of the soldering rod element 42 into the axial duct 40 of the muzzle tip member 24.

Referring to FIGURE 3, a form of the cocking mechanism is illustrated which is alternative to the detent 56 and cam element 52, 54. The cocking shaft 44 is provided with a key element 100 carried by and as an integral part of the cocking shaft. The key element 100 extends for substantially the entire length of the shaft but stops short of the forward end thereof as shown. A keyway channel 102 is provided axially through the bushing member 26 for permitting passage therethrough of the key element 100 provided the latter is angularly properly aligned therewith. Once pulled all the way rearwardly, as shown, the shaft may be rotated so that the forward end of the key element 100 is disposed in a detent 104 in the rear face of the bushing member 26. In this condition, the air passage provided by the channel 102 is sealed by a soft rubberlike sealing washer 106 which is held compressively between the front face of the bushing member 26 and a retaining collar 108 carried by the tip end of the cocking shaft 44. To recock the shaft, it may be rotated until the key element 100 may pass forwardly through the channel 102 to permit the full forward movement of the cocking shaft.

In FIGURE 4, an example of a more directly heated tip element is illustrated. A pair of resistive heating elements 110, 112 are shown disposed within the forward portion of the soldering element 42. One end of the heating element 110 is grounded to the soldering element with the opposite end terminating in a lead 114 externally of the soldering element as do both ends of the element 112 in leads 116, 118. The leads 114 and 116 permit the elements 110, 112 to be connected either in series or parallel for purposes of adapting the unit readily to different supply voltages.

A temperature sensor lead 120 is also brought out of the soldering element 42 for coupling a sensor element 122 to the amplifier 92. As illustrated in FIGURE 5 these leads may be coupled from the soldering element 42, to the body of the unit 10 and thence to the amplifier 92 therewithin by slip ring type connectors 124, 126, and beryllium fingers 128 carried by the piston member 28 in electrically connective relation with, respectively, the pin members 66, 68 (or associated portions thereof, as desired) and the tubular body member 16.

Referring to FIGURE 6, an alternative example of the muzzle portion of the assembly is illustrated in frontal elevation. The solder dispenser tube 84 is removed and stored in a storage port 84'. The solder 80 is then brought directly out of its feed line 130. A shearing plate 132 is pivotally mounted on a pin 134 and may be rotated laterally to shear a desired length of solder from the supply roll. A detent catch 136 is provided to secure the plate in its normal position. Similarly the plate may be revolved out of effect when it is desired to reinsert the dispensing tube 84 and feed solder directly to the tip as discussed in connection with the earlier figures.

In FIGURE 7 a similar shearing plate 138 is shown pivotally mounted on the handle portion 14 of the unit. By this means, solder may be pulled as desired from the supply spool 82 and sheared to desired lengths.

Referring to FIGURE 8, an alternative embodiment of the automatic solder feeding feature of the invention is illustrated. The leaf ratchet 86 mounted on the trigger actuating member 76 is held in direct contact with the solder 80 only during forward motion of the trigger member 76. In the reverse direction a boss 140 with an angled port therethrough for holding the ratchet 86 is automatically slid relatively forward by reason of frictional contact between the boss 140 and the solder at the contact point 142. This displacement in cooperation with the angled port through the boss holds the leaf ratchet away from the solder thusly to preclude any tending to buckle the solder due to friction between it and the leaf ratchet. The boss may be held constantly forwardly when no solder feeding is desired while the trigger is, for example, to be used exclusively for other purposes. To accomplish such holding action, a rotatable cam cylinder 144, actuatable by the trigger finger of the operator, may be rotated as shown by the arrow 146 about a vertical axis whereby a cam extension 148 on the top end of the cylinder holds the boss constantly forward.

There have thus been disclosed and described a number of structural aspects of a solder-desoldering implement which achieve the objects and exhibit the advantages set forth hereinabove. It is reiterated that much detail has been omitted from the preceding discussion where conventional techniques and design criteria known to skilled artisans in the field would permit them readily to supply such details as needed and desired for particular applications. In this category, for example, lie the choice of materials for the implement and its component parts, the particular design of the heating coil, the solder magazine detail, and the like.

What is claimed is:
1. Combination solder-desolder apparatus comprising: pistol-shaped body having
    trigger actuator member,
    hollow pistol grip handle portion,
    hollow tubular barrel member having forward muzzle end and rear, bushing, breach end,
    elongated hollow base portion extending along and contiguously to said barrel member and connecting to said handle potrion,
    hollow muzzle tip member carried by said forward end of said tubular barrel member and having an axial bore therethrough, and including a soldering rod heating coil means disposed contiguously about said axial bore,
    cocking shaft bushing member carried by said bushing, breach, end of said tublar barrel member,
    piston member disposed axially slidably within said barrel member,
    soldering rod element carried centrally by said piston member and being radially dimensioned to be insertable through said axial bore of said muzzle tip member and protruding forwardly thereof when said piston member is disposed axially forwardly in said barrel member, and said soldering rod element being at such times in heat energy exchangeable relation with said heating coil means,
    trigger means carried by said tubular body mem- ber and coupled to said trigger actuating member for releasably retaining said piston member in said axially forward disposition, and energy storage means housed within said tubular member and force coupled to said piston member for forcing said piston member rapidly rearwardly when said trigger means is actuated.

2. The invention to claim 1 which further includes hollow cocking shaft means protruding slidably through said bushing member in an engageable relation with the rear surface of said piston member, and in which said energy storage means comprises spring means interconnected in tension between the rear of said piston member and the rear of said cocking shaft and being disposed at least in part, freely within the elongate hollow confines thereof, and cocking shaft retaining means disposed contiguously to said rear, breach, end of said tubular member for holding said cocking shaft in a rearward disposition, and in which said trigger means comprises piston member engaging trigger member carried contiguously to said forward end of said tubular body member for releasably retaining said piston member in a forward disposition, said trigger means being mechanically coupled to said trigger actuator member.

References Cited

UNITED STATES PATENTS 3,181,763   5/1965   Koga _____ 228—53
3,114,026   12/1963  Fortune _____ 228—53

RICHARD H. EANES, Jr., *Primary Examiner.*